No. 845,151. PATENTED FEB. 26, 1907.
B. F. WEBER.
LARDING NEEDLE.
APPLICATION FILED MAY 16, 1905.
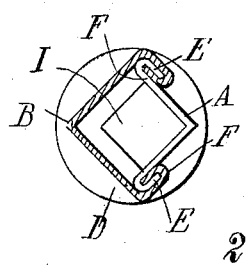
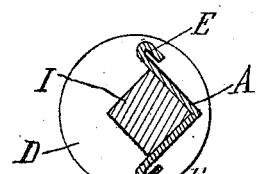
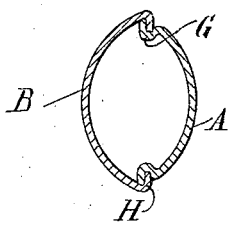
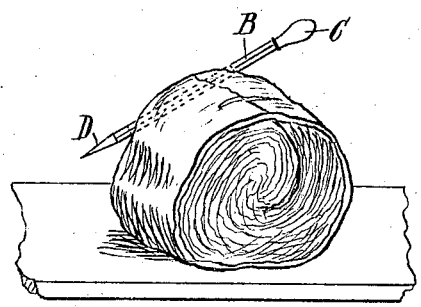
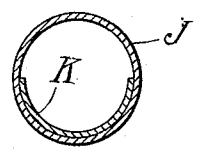
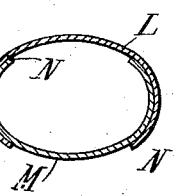
Witnesses
R. A. Fischer
E. F. Wilson
Inventor
Bernard F. Weber
By Rudolph M. ... Atty.
THE NORRIS PETERS CO., WASHINGTON, D. C.

UNITED STATES PATENT OFFICE.

BERNARD F. WEBER, OF CHICAGO, ILLINOIS.

LARDING-NEEDLE.

No. 845,151.   Specification of Letters Patent.   Patented Feb. 26, 1907.

Application filed May 16, 1905. Serial No. 260,641.

*To all whom it may concern:*

Be it known that I, BERNARD F. WEBER, a citizen of the United States, residing at Chicago, in the county of Cook and State of Illinois, have invented certain new and useful Improvements in Larding-Needles; and I do hereby declare the following to be a full, clear, and exact description of the invention, such as will enable others skilled in the art to which it appertains to make and use the same.

My invention relates to a novel construction in a larding-needle, the object being to provide a device of this character which will enable the operator to insert the strip of bacon or salt pork without danger of tearing same and with greater rapidity, and consists in the features of construction and combinations of parts hereinafter fully described and claimed.

In the accompanying drawings, illustrating my invention, Figure 1 is a view in side elevation of a larding-needle constructed in accordance with my invention. Fig. 2 is a transverse section of the same, on an enlarged scale, on the line 2 2 of Fig. 1. Fig. 3 is a transverse section of the same on an enlarged scale, on the line 3 3 of Fig. 1. Fig. 4 is a transverse section showing a modified form of construction. Fig. 5 is a view of a roast, showing my larding-needle passed therethrough preparatory to depositing the strip of bacon or salt pork therein in proper position. Figs. 6 and 7 are detail transverse sections showing further modifications of construction.

In larding roasts, &c., great difficulty is experienced by reason of the fact that the strips of bacon or salt pork passed through are very tender and tear very easily. To render the larding operation easy and prevent tearing of the strips of salt pork, bacon, or the like, my said larding-needle comprises two relatively telescopically-movable channeled members A and B, together forming a tube, one of said members carrying a handle C and the other thereof a spear or point D, which readily passes through the roast to be larded. The said members A and B are so connected on their edges that each forms a guide in which the other is movable, the said member A being to this end provided with outwardly-overturned flanges E and the member B with inwardly-overturned flanges F, the free edges of the latter being adapted to enter and fit the grooves thus provided between the said flanges E and the side walls of the member A, and vice versa.

In Figs. 1, 2, and 3 I have shown the needle as being rectangular in cross-section; but this shape may be altered as desired, and in Fig. 4 I have illustrated a modified shape, which is substantially elliptical in cross-section. The form of sliding joint between the members A and B is also capable of modification—as, for example, is illustrated in Fig. 4, in which the side edges of the member are bent inwardly and then upwardly and outwardly to form substantially U-shaped guide-grooves G, which are adapted to receive the inwardly-extending flanges H of the member B. The said handle C and point D are secured to the said members A and B in any suitable manner, the said point being provided with an extension I, corresponding in shape in cross-section with the shape of the tube formed by said members A and B and serving to partially reinforce the latter.

In Figs. 6 and 7 I have shown further modifications lying within the scope of my invention. As shown in Fig. 6, one member J consists of a tube and the member K of a telescopically-interfitting semicylindrical member corresponding to the member A shown in Fig. 1. In Fig. 7 the members L and M each consist of a substantially elliptical tube having a longitudinal slot N extending the entire length thereof, said members being adapted to interfit telescopically, so that the slots N therein are oppositely disposed.

The operation of my device is as follows: The members A and B being first partially separated, as shown in Fig. 1, the strip of bacon or salt pork is laid in the member A and the member B then moved to the forward limit of its movement to completely cover the strip. The needle is then passed through the roast, and when a position therein has been attained which would cause the ends of the contained strip to project from the opening in the roast the member A is held, while the member B is drawn back and out of the opening, and then the member A is drawn entirely through the opening, thus leaving the strip of bacon or salt pork in the desired position. Should the latter follow said member A, it can be readily prevented from being withdrawn therewith by placing a finger against the end of same in an obvious manner. In depositing the strip of bacon or salt pork the members A and B are necessarily entirely separated and must be reinserted in proper relative position to repeat the foregoing operations.

The device is simple, cheap, and efficient and can be made in suitable size and shape and of any metal suited to the purpose.

I claim as my invention—

A larding-needle comprising two separable, relatively telescopically movable members, one of which carries a handle and the other of which carries a point, said members being provided on their side edges with interfitting guides and together constituting a tubular receptacle for strips of bacon, salt pork or the like.

In testimony whereof I have signed my name in presence of two subscribing witnesses.

BERNARD F. WEBER.

Witnesses:
 RUDOLPH WM. LOTZ,
 E. F. WILSON.